US009828263B2

(12) United States Patent
Kroener et al.

(10) Patent No.: US 9,828,263 B2
(45) Date of Patent: Nov. 28, 2017

(54) METHOD OF REMOVING PARTICULATE SILICON FROM AN EFFLUENT WATER

(71) Applicant: Infineon Technologies AG, Neubiberg (DE)

(72) Inventors: Friedrich Kroener, Villach (AT); Zeljka Kroener, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 68 days.

(21) Appl. No.: 14/470,998

(22) Filed: Aug. 28, 2014

(65) Prior Publication Data
US 2016/0060144 A1 Mar. 3, 2016

(51) Int. Cl.
C02F 1/52 (2006.01)
C02F 101/10 (2006.01)
C02F 103/34 (2006.01)
C02F 1/72 (2006.01)

(52) U.S. Cl.
CPC .......... C02F 1/5236 (2013.01); *C02F 1/72* (2013.01); *C02F 2101/10* (2013.01); *C02F 2101/103* (2013.01); *C02F 2103/346* (2013.01); *C02F 2209/02* (2013.01); *C02F 2305/02* (2013.01)

(58) Field of Classification Search
CPC ........................................................ C02F 1/52
See application file for complete search history.

(56) References Cited

U.S. PATENT DOCUMENTS

| 6,413,417 | B1 * | 7/2002 | Yamasaki | C02F 1/5245 210/151 |
| 7,172,699 | B1 | 2/2007 | Trivedi et al. | |
| 2002/0113023 | A1 * | 8/2002 | Krulik | C02F 1/5245 210/749 |
| 2012/0205318 | A1 * | 8/2012 | Tanida | C02F 1/5236 210/726 |

FOREIGN PATENT DOCUMENTS

| CN | 101327622 A | 12/2008 |
| DE | 296471 A5 | 12/1991 |
| WO | 0185619 A1 | 11/2001 |

OTHER PUBLICATIONS

F. Kroener et al., All Electrochemical Layer Deposition for crystalline Silicon solar cell manufacturing; Solar Energy 86(2012), Jan. 2012, pp. 548-557, vol. 86, Issue 1, International Solar Energy Society.
Duan Junyuan et al.: "Study on Treatment of Rhodamine B Wastewater by Micro-electrolysis and Coagulation Method", Feb. 28, 2014, 7 pages, Technology & Development of Chemical Industry, vol. 43, No. 2—abstract included.

* cited by examiner

*Primary Examiner* — Peter Keyworth
(74) *Attorney, Agent, or Firm* — Viering, Jentschura & Partner mbB

(57) ABSTRACT

A method of removing particulate silicon from an effluent water in accordance with various embodiments may include: adding a base to the effluent water, an amount of the added base being sub-stoichiometric with regard to a basic oxidation reaction of an entire amount of silicon contained in the effluent water to ortho-silicic acid or ortho-silicate ions; maintaining a resulting mixture of the effluent water and the base in a predetermined temperature range for a period of time, so that a sediment including silicon is formed; and (Continued)

separating the sediment and the effluent water from each other.

21 Claims, 11 Drawing Sheets

| adding a base to the effluent water, an amount of the added base being sub-stoichiometric with regard to a basic oxidation reaction of an entire amount of silicon contained in the effluent water to ortho-silicic acid | 102 |

| adding to the effluent water a component selected from the group consisting of triammonium phosphate, diammonium phosphate, mono-ammonium phosphate, ammonium polyphosphate, ammonium sulfate, ammonium hydrogen sulfate and combinations thereof | 104 |

| maintaining a resulting mixture of the effluent water and the base in a predetermined temperature range for a period of time, so that a sediment including silicon is formed | 106 |

| separating the sediment and the effluent water from each other | 108 |

| adding a base to the effluent water in such an amount that a molar ratio of aqueous hydroxide ions provided by the base in the effluent water to silicon contained in the effluent water is less than or equal to 2:1 | — 202 |

| adding to the effluent water a component selected from the group consisting of triammonium phosphate, diammonium phosphate, mono-ammonium phosphate, ammonium polyphosphate, ammonium sulfate, ammonium hydrogen sulfate and combinations thereof | — 204 |

| maintaining a resulting mixture of the effluent water and the base in a predetermined temperature range for a period of time so as to allow formation of a sediment including silicon | — 206 |

| separating the sediment and the effluent water from each other | — 208 |

(a)

1

(c)

(c')

3 5

(d)

(d)

3  5

US 9,828,263 B2

METHOD OF REMOVING PARTICULATE SILICON FROM AN EFFLUENT WATER

TECHNICAL FIELD

Various embodiments relate to a method of removing particulate silicon from an effluent water.

BACKGROUND

An effluent water may result from an industrial process. Such an effluent water may contain solid content. For example, the solid content may include or form particles. For example, the solid content can include silicon. For example, the effluent water and the solid content thereof may result from the production of one or more semiconductor chips and/or the processing of one or more semiconductor wafers. For example, processing of a semiconductor wafer, for example by one or more of grinding, polishing and thinning of the wafer, may result in an effluent water containing silicon in the form of small particles suspended or distributed in the effluent water. For example, the effluent water and the solid content thereof may additionally contain a dopant, such as arsenic.

SUMMARY

In accordance with various embodiments, a method of removing particulate silicon from an effluent water may include: adding a base to the effluent water, an amount of the added base being sub-stoichiometric with regard to a basic oxidation reaction of an entire amount of silicon contained in the effluent water to ortho-silicic acid ($Si(OH)_4$); maintaining a resulting mixture of the effluent water and the base in a predetermined temperature range for a period of time, so that a sediment including silicon is formed; and separating the sediment and the effluent water from each other.

In accordance with various embodiments, a method of removing particulate silicon from an effluent water may include adding a base to the effluent water in such an amount that a molar ratio of aqueous hydroxide ions provided by the base in the effluent water to silicon contained in the effluent water is less than or equal to 2:1, e.g. less than or equal to 1:1; maintaining a resulting mixture of the base and the effluent water in a predetermined temperature range for a period of time so as to allow formation of a sediment including silicon; and separating the sediment and the effluent water from each other.

In accordance with various embodiments, a method of removing particulate silicon from an effluent water may include: providing 0.02 to 0.1 mol of dissolved sodium hydroxide in the effluent water per gram silicon contained in the effluent water or providing 0.02 to 0.1 mol of dissolved potassium hydroxide in the effluent water per gram silicon contained in the effluent water or providing 0.01 to 0.05 mol of dissolved calcium hydroxide in the effluent water per gram silicon contained in the effluent water or providing 0.02 to 0.1 mol of dissolved barium hydroxide in the effluent water per gram silicon contained in the effluent water or providing 0.02 to 0.1 mol of ammonium in the effluent water per gram silicon contained in the effluent water or providing 0.02 to 0.1 mol of dissolved sodium hydroxide in the effluent water per gram silicon contained in the effluent water, wherein the dissolved sodium hydroxide is partially or entirely substituted with one or more of the following: dissolved potassium hydroxide in a molar substitution ratio of 1:1, dissolved calcium hydroxide in a molar substitution ratio of 1:2 (that is, two parts sodium hydroxide may be replaced with one part calcium hydroxide), dissolved barium hydroxide in a molar substitution ratio of 1:2 and ammonium in a molar substitution ratio of 1:1; maintaining a resulting mixture of the effluent water and one or more of the dissolved sodium hydroxide, the dissolved potassium hydroxide, the dissolved calcium hydroxide, the dissolved barium hydroxide and the ammonium in a predetermined temperature range for a period of time so as to allow formation of a sediment including silicon; and separating the sediment and the effluent water from each other.

BRIEF DESCRIPTION OF THE DRAWINGS

In the drawings, like reference characters generally refer to same or similar parts throughout the different views. The drawings are not necessarily to scale, emphasis instead generally being placed upon illustrating the principles of the invention. In the following description, various embodiments are described with reference to the following drawings, in which:

FIG. 1 is a flow chart illustrating a method of removing particulate silicon from an effluent water in accordance with various embodiments;

FIG. 2 is a flow chart illustrating a method of removing particulate silicon from an effluent water in accordance with various embodiments;

DESCRIPTION

Figure 3:
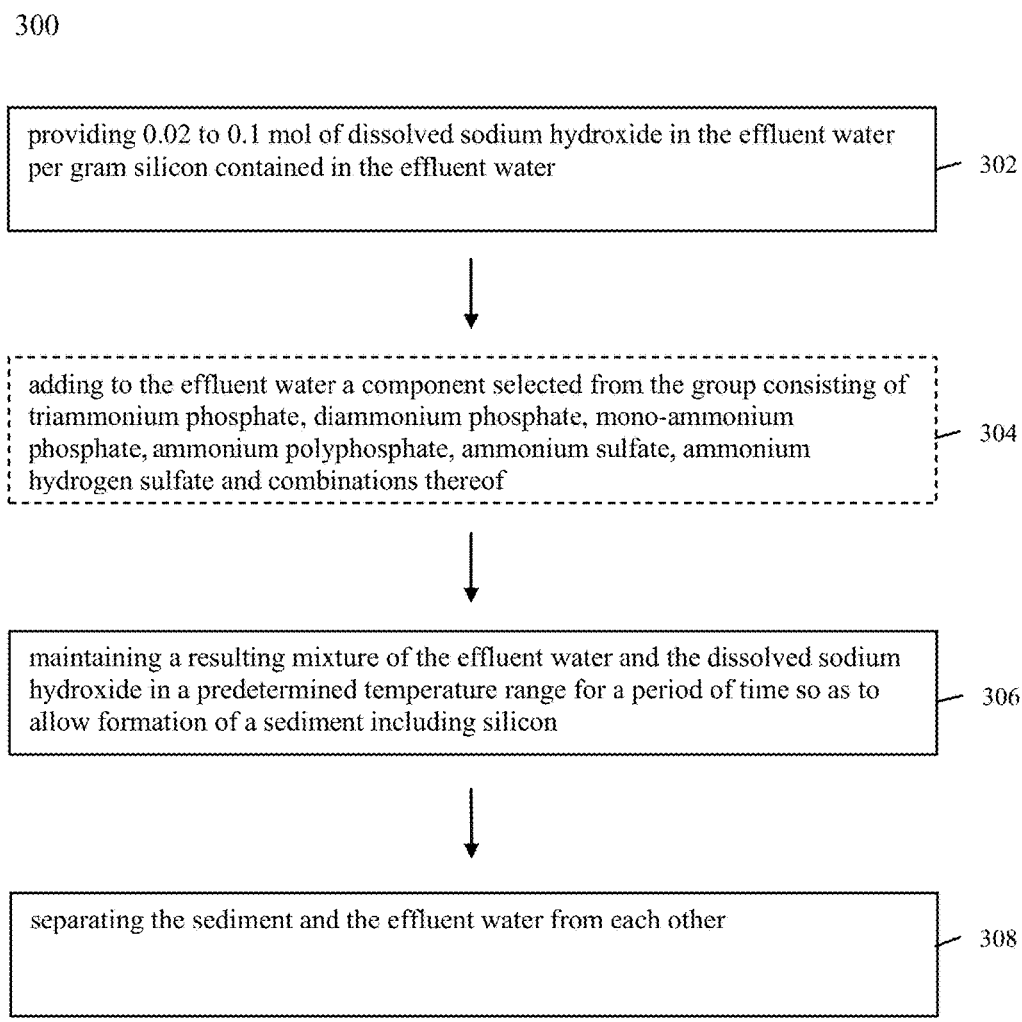
FIG. 3 is a flow chart illustrating a method of removing particulate silicon from an effluent water in accordance with various embodiments.

The following detailed description refers to the accompanying drawings that show, by way of illustration, specific details and embodiments in which the invention may be practised. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as all or some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

The terms "at least one" and "one or more" may be understood to include any integer number greater than or equal to one, i.e. one, two, three, four, . . . , etc.

Processing of a semiconductor wafer, for example by one or more of grinding, polishing (for example chemical mechanical polishing) and thinning of the wafer, may result in an effluent water containing silicon in the form of particles. Sometimes, the effluent water may additionally contain a dopant, such as arsenic. In certain cases it might be helpful to treat or purify such an effluent water by removing the particulate silicon from the effluent water.

To this end, the effluent water may be filtrated, that is, the entire effluent water may be led through a filter element so as to leave behind and thereby separate the silicon particles. However, such a process might be complex and expensive. For example, a filter element might have to be replaced regularly.

Alternatively, the effluent water may be provided in a sedimentation basin so as to allow the silicon particles to sediment to the bottom of the basin ("normal sedimentation"). Later on, the clarified effluent water above the sediment may be removed from the sediment so as to separate the sediment and the effluent water from each other. However, such a process might last for weeks or months due to the low sedimentation speed of the small silicon particles.

As a further alternative, a metal salt (such as iron chloride) and a base (such as sodium hydroxide) may be added to the effluent water so as to bind and sediment the silicon particles by means of co-precipitation. The precipitate (iron hydroxide including silicon) forming a sediment or sludge at the bottom of a vessel and the clarified effluent water above the precipitate may then be separated from each other.

An aspect of various embodiments described herein is to provide a method of treating or purifying an effluent water, in particular a method of removing particulate silicon from an effluent water. A method of removing particulate silicon from an effluent water in accordance with various embodiments of this disclosure may allow rapid formation of a sediment including at least a part of the silicon amount initially contained in the effluent water (for example, when compared to the "normal sedimentation").

Alternatively or additionally, a method of removing particulate silicon from an effluent water in accordance with various embodiments of this disclosure may allow formation of a sediment including at least a part of the silicon amount initially contained in the effluent water without the use of a metal salt.

Alternatively or additionally, a method of removing particulate silicon from an effluent water in accordance with various embodiments of this disclosure may allow separation of at least a part of the silicon particles in a cost-effective and/or simple and/or reliable and/or rapid manner.

Alternatively or additionally, a method of removing particulate silicon from an effluent water in accordance with various embodiments of this disclosure may allow treatment of large quantities of effluent water, such as quantities of up to 1000 $m^3$ per day.

Basically, it is possible to completely dissolve silicon in a hot alkali solution, provided that a sufficient amount of a base is provided in the solution. The silicon is attacked by the base and reacts to silicic acid. Thereby, the dark silicon particles "disappear" and the solution becomes transparent. The silicic acid may then polymerize to form silicic acid particles, for example having a size of a few nanometers.

Using the above approach, silicon particles can be removed from effluent water by dissolving them. The formation of a sludge containing sedimented silicon particles (and optionally one or more dopants) in a wastewater treatment plant could thus be avoided.

However, formation of a sludge or sediment containing silicon may have an effect that silicon may be at least partially recovered or removed from the effluent water (instead of dissolving it therein). Further, other substances, such as a dopant, may be sedimented together with silicon.

An aspect of various embodiments described herein may be seen in that by adding a reduced or small amount of a base to the effluent water (instead of adding an amount necessary to dissolve the complete amount of silicon), a portion of the silicon contained in the effluent water sediments (in contrast to being dissolved), although another portion of the silicon may still be dissolved. This sedimentation may take place in a time period being much shorter than a time period required to sediment the silicon particles in untreated effluent water (normal or natural sedimentation). This may be due to the formation of silicon agglomerates. Therefore, the sedimentation caused by the addition of a reduced amount of a base may be referred to as a "promoted" or "forced" sedimentation.

Another aspect of various embodiments described herein may be seen in that by additionally adding a specific compound (such as diammonium phosphate; see below) to the effluent water, the above sedimentation effect can be enhanced, so that more silicon may be sedimented. Thus, the sedimentation may be further promoted by adding the specific compound.

The (promoted) sedimentation of silicon may take place in a period of time being even shorter than a period of time required to completely dissolve the silicon particles.

FIG. 1 shows a flow chart illustrating a method 100 of removing particulate silicon from an effluent water in accordance with various embodiments.

Method 100 may include adding a base to the effluent water (in 102), an amount of the added base being sub-stoichiometric with regard to a basic oxidation reaction of an entire amount of silicon contained in the effluent water to ortho-silicic acid or ortho-silicate ions; maintaining a resulting mixture of the effluent water and the base in a predetermined temperature range for a period of time, so that a sediment including silicon is formed (in 106); and separating the sediment and the effluent water from each other (in 108).

In one or more embodiments, method 100 may further include adding a specific component to the effluent water (in 104). The specific component may be selected from the group consisting of diammonium phosphate, mono-ammonium phosphate, ammonium sulfate, ammonium hydrogen sulfate and combinations thereof. In other words, reference numeral 104 indicates an optional step. In one or more embodiments, adding the specific component to the effluent water may be carried out after adding the base to the effluent water. In one or more embodiments, adding the specific component to the effluent water may be carried out before adding the base to the effluent water. In one or more embodiments, adding the base to the effluent water and adding the specific component to the effluent water may be carried out simultaneously.

In 102 the base is added to the effluent water in a sub-stoichiometric amount. Therefore, it can be avoided that an entire amount of silicon contained in the effluent water is completely dissolved by the base.

For example, based on the below equation (1), a sub-stoichiometric amount may mean that a molar ratio of aqueous hydroxide ions provided/formed by the base in the effluent water to an entire amount of silicon contained in the effluent water is less than 4:1, for example equal to or less than 2:1, for example equal to or less than 1:1.

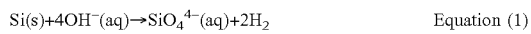  Equation (1)

Accordingly, when a sub-stoichiometric amount of the base is added to the effluent water, it is not possible that the entire amount of silicon contained in the effluent water reacts to silicic acid. Such a complete reaction of the entire amount of silicon would dissolve the silicon particles contained in the effluent water, so that the silicon can no longer be separated via sedimentation.

According to various embodiments, the added amount of the base is adjusted so that at least some of the silicon particles do not entirely react with and are not entirely dissolved by aqueous hydroxide ions, but instead react with aqueous hydroxide ions on an outer surface thereof and agglomerate with other silicon particles (for example via a condensation reaction). The agglomerated silicon particles may then sediment to the bottom of a vessel or basin receiving the effluent water so that they can easily be separated from the clarified effluent water above the sediment.

Therefore, it should be understood by those skilled in the art that it is not necessary or mandatory that a reaction according to the above equation (1) actually occurs in a method according to the present disclosure (in particular not with regard to each and every silicon particle), but instead the above equation may be used only to determine the sub-stoichiometric amount of the base to be used in the method according to the present disclosure.

For example, in 102 the base may contain one or more of sodium hydroxide, potassium hydroxide, calcium hydroxide, barium hydroxide and ammonia.

In 106 the resulting mixture of the base and the effluent water is maintained in a predetermined temperature range for a period of time. If necessary, the resulting mixture may be externally heated to bring and/or to maintain the mixture to/in the predetermined temperature range. For example, the period of time may be several minutes, and in an exemplary embodiment the predetermined temperature range may be 40 to 80° C. Maintaining the mixture in the predetermined temperature range for the period of time leads to the formation of the sediment containing silicon (optionally also one or more dopants). Once the sediment is formed, maintaining the mixture in the predetermined temperature range for the period of time may be terminated.

Therefore, silicon may be removed from the effluent water in 108 by separating the effluent water and the sediment containing silicon from each other, e.g. by decantation of the clarified effluent water above the sediment or by draining out the clarified effluent water above the sediment.

In the method 100 the silicon particles may be initially evenly distributed or suspended in the effluent water so as to form a dispersion (e.g., suspension or slurry) containing small solid silicon particles. Further, the silicon particles contained in the effluent water may generally tend to form a sediment including silicon, and provided that the effluent water is left for a sufficient time period (for example, several weeks or months) the silicon particles may settle or sediment so that they can be separated from the effluent water via a "normal" sedimentation (without adding any chemicals, such as a base).

In accordance with various embodiments, the formation of a sediment including silicon may be expedited or promoted by adding the base to the effluent water in 102 (compared to a normal sedimentation).

In one or more embodiments, the formation of a sediment including silicon may be further enhanced by additionally adding the specific component to the effluent water in 104. In this respect, the inventors observed that by the further addition of for example diammonium phosphate the amount of sediment and the amount of silicon contained in the sediment can be significantly increased.

FIG. 2 shows a flow chart illustrating a method 200 of removing particulate silicon from an effluent water in accordance with various embodiments.

Method 200 may include adding a base to the effluent water in such an amount that a molar ratio of aqueous hydroxide ions provided by the base in the effluent water to silicon contained in the effluent water is less than or equal to 2:1, e.g. less than or equal to 1:1 (in 202); maintaining a resulting mixture of the effluent water and the base in a predetermined temperature range for a period of time so as to allow formation of a sediment including silicon (in 206); and separating the sediment and the effluent water from each other (in 208).

In one or more embodiments, method 200 may further include adding a specific component to the effluent water (in 204). The specific component may be selected from the group consisting of diammonium phosphate, mono-ammonium phosphate, ammonium sulfate, ammonium hydrogen sulfate and combinations thereof. In other words, reference numeral 204 indicates an optional step. In one or more embodiments, adding the specific component to the effluent water may be carried out after adding the base to the effluent water. In one or more embodiments, adding the specific component to the effluent water may be carried out before adding the base to the effluent water. In one or more embodiments, adding the base to the effluent water and adding the specific component to the effluent water may be carried out simultaneously.

FIG. 3 shows a flow chart illustrating a method 300 of removing particulate silicon from an effluent water in accordance with various embodiments.

Method 300 may include providing 0.02 to 0.1 mol of dissolved sodium hydroxide in the effluent water per gram silicon contained in the effluent water (in 302); maintaining a resulting mixture of the effluent water and the dissolved sodium hydroxide in a predetermined temperature range for a period of time so as to allow formation of a sediment including silicon; and separating the sediment and the effluent water from each other.

In 302, instead of providing 0.02 to 0.1 mol of dissolved sodium hydroxide in the effluent water per gram silicon contained in the effluent water, it also possible to provide 0.02 to 0.1 mol of dissolved potassium hydroxide in the effluent water per gram silicon contained in the effluent water, or to provide 0.01 to 0.05 mol of dissolved calcium hydroxide in the effluent water per gram silicon contained in the effluent water, or to provide 0.02 to 0.1 mol of dissolved barium hydroxide in the effluent water per gram silicon contained in the effluent water, or to provide 0.02 to 0.1 mol of ammonium (for example resulting from ammonia) in the effluent water per gram silicon contained in the effluent water, or to provide 0.02 to 0.1 mol of dissolved sodium hydroxide in the effluent water per gram silicon contained in the effluent water, wherein the dissolved sodium hydroxide is partially or entirely substituted with one or more of the following: dissolved potassium hydroxide in a molar substitution ratio of 1:1, dissolved calcium hydroxide in a molar substitution ratio of 1:2, dissolved barium hydroxide in a molar substitution ratio of 1:2 and ammonium in a molar substitution ratio of 1:1.

In one or more embodiments, method 300 may further include adding a specific component to the effluent water (in 304). The specific component may be selected from the group consisting of diammonium phosphate, mono-ammonium phosphate, ammonium sulfate, ammonium hydrogen sulfate and combinations thereof. In other words, reference numeral 304 indicates an optional step. In one or more embodiments, adding the specific component to the effluent water may be carried out after providing the dissolved hydroxide in the effluent water. In one or more embodiments, adding the specific component to the effluent water may be carried out before providing the dissolved hydroxide in the effluent water. In one or more embodiments, providing the dissolved hydroxide in the effluent water and adding the specific component to the effluent water may be carried out simultaneously.

In the following, examples in which the present disclosure has been put into practice are described with reference to FIGS. 4 to 9 of the drawings.

Effluent Water

Figure 4:
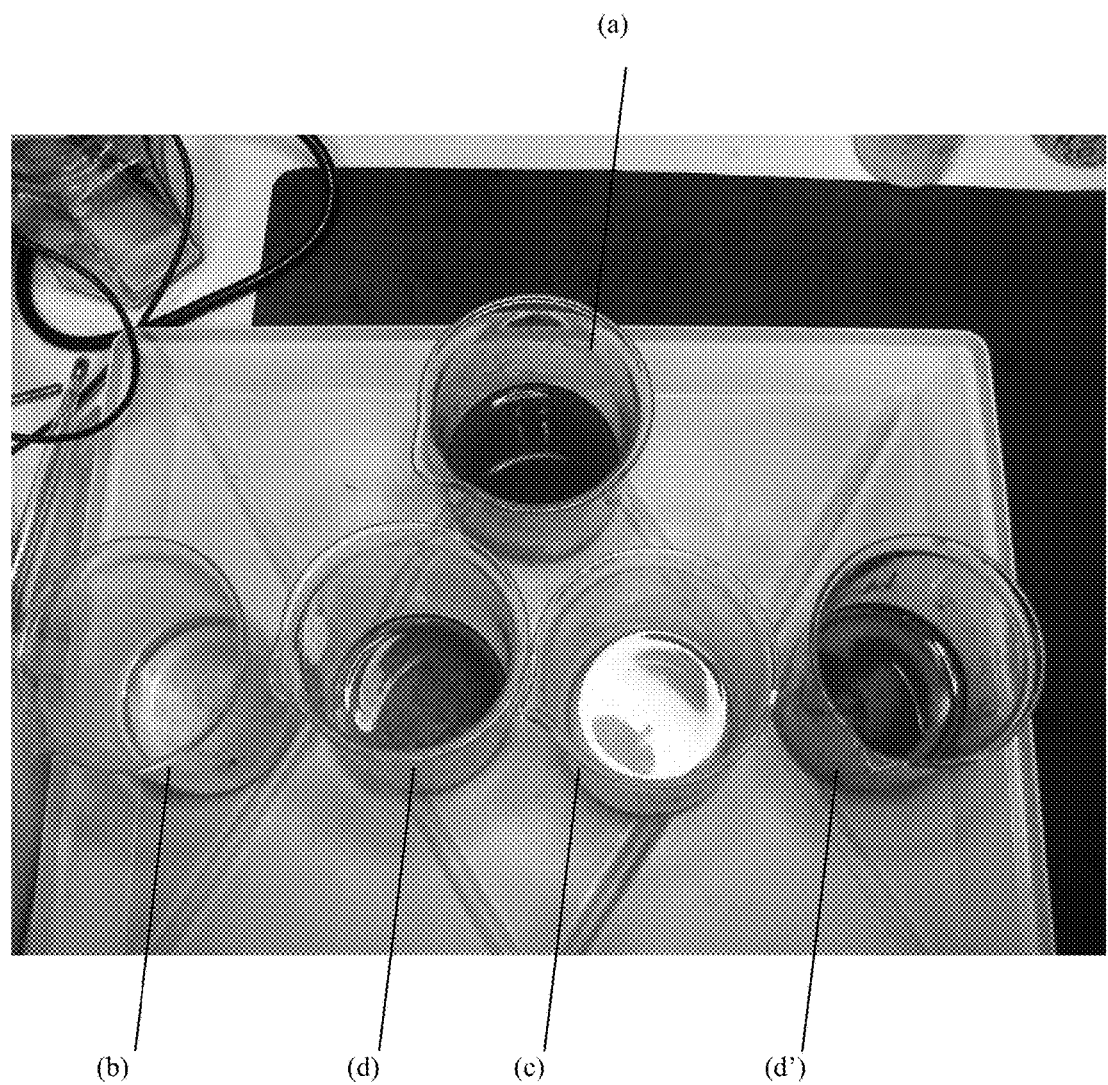
FIG. 4 shows a photograph of several laboratory beakers, with the upper laboratory beaker containing an untreated effluent water (a sample of effluent water), and with the laboratory beakers of the lower row containing differently treated effluent waters (forming examples and a comparative example of the present disclosure)
Figure 5:
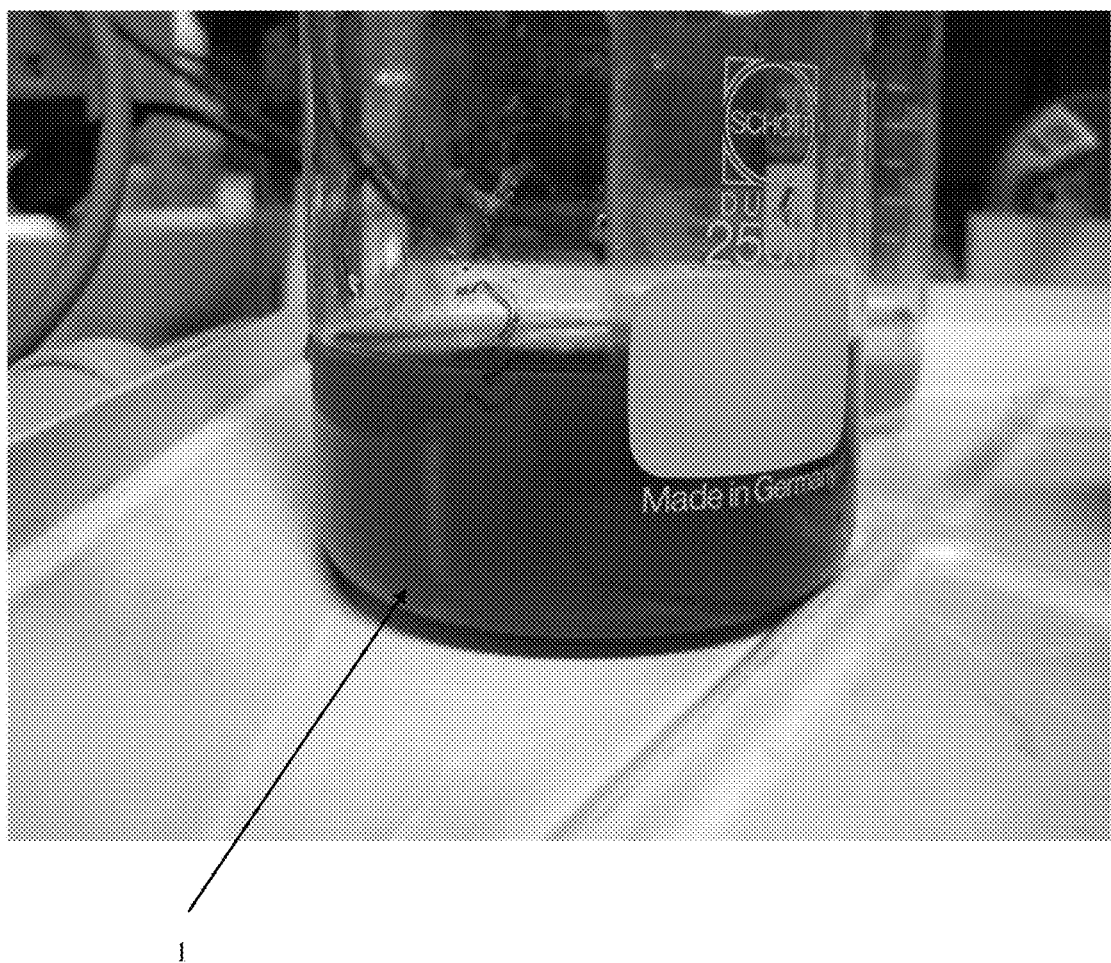
FIG. 5 shows an enlarged photograph of the upper laboratory beaker of FIG. 4.

First, a sample (a) has been taken from an effluent water originating from a production of chips, in particular from a wafer polishing process. The sample (a) was distributed to several laboratory beakers. A picture of such a laboratory beaker (containing the sample (a)) is shown in FIG. 4 (on top) and in FIG. 5. As can be seen from these pictures (see in particular FIG. 5), the effluent water/sample (a) forms a dispersion 1 (e.g., slurry or suspension) containing small silicon particles evenly distributed therein. The dispersion 1 has a dark and turbid appearance or character.

The amount of silicon particles contained in the sample (a) (or respective beaker) was approximately 100 mg per liter, with most of the silicon particles contained in the effluent water being in a sub micrometer range. Further, the effluent water/sample contained a small amount of arsenic.

It was observed that the small silicon particles would settle or sediment (so that they could be separated from the effluent water via a normal sedimentation), provided that the sample is left for a sufficient time period (for example, several weeks or months).

To expedite formation of a sediment containing silicon, the effluent water/sample was treated with a base, resulting in examples (c), (c'), (d) and (d'). These examples are shown in FIGS. 4, 6-9. In all of these examples a base was added to the effluent water/sample in a sub-stoichiometric amount (with regard to a basic oxidation reaction of an entire amount of silicon contained in the effluent water to ortho-silicic acid or ortho-silicate ions). Further, in all of these examples a sediment including silicon could be formed. In examples (d) and (d') the effluent water/sample was additionally treated with diammonium phosphate. Thereby, the sedimentation effect could be amplified, and the amount of the formed sediment could be increased. Reference numeral (b) in FIG. 4 denotes a comparative example which was obtained by treating the sample (a)/effluent water with an over-stoichiometric amount of a base (with regard to a basic oxidation reaction of an entire amount of silicon contained in the effluent water to ortho-silicic acid or ortho-silicate ions).

Comparative Example

As can be seen from FIG. 4, when a base is added to the effluent water/sample (a) in an over-stoichiometric amount, the silicon contained in the effluent water is completely dissolved in the effluent water so as to result in a rather clear or transparent solution (b). Thus, the silicon cannot be separated from the effluent water anymore (at least not via sedimentation).

The comparative example (b) was obtained by adding 0.8 mmol/l of NaOH to the effluent water/sample (a). After approximately 5 minutes at 60° C. the silicon particles were dissolved, and the initially dark dispersion of silicon particles turned into a rather clear solution. It is assumed that the addition of an overstoichiometric amount of NaOH to the effluent water has the effect that hydroxylated silicon $(Si(OH)_4)$ is formed and reacts by a polymerisation reaction to a polymeric silicic acid.

Examples

Figure 6:
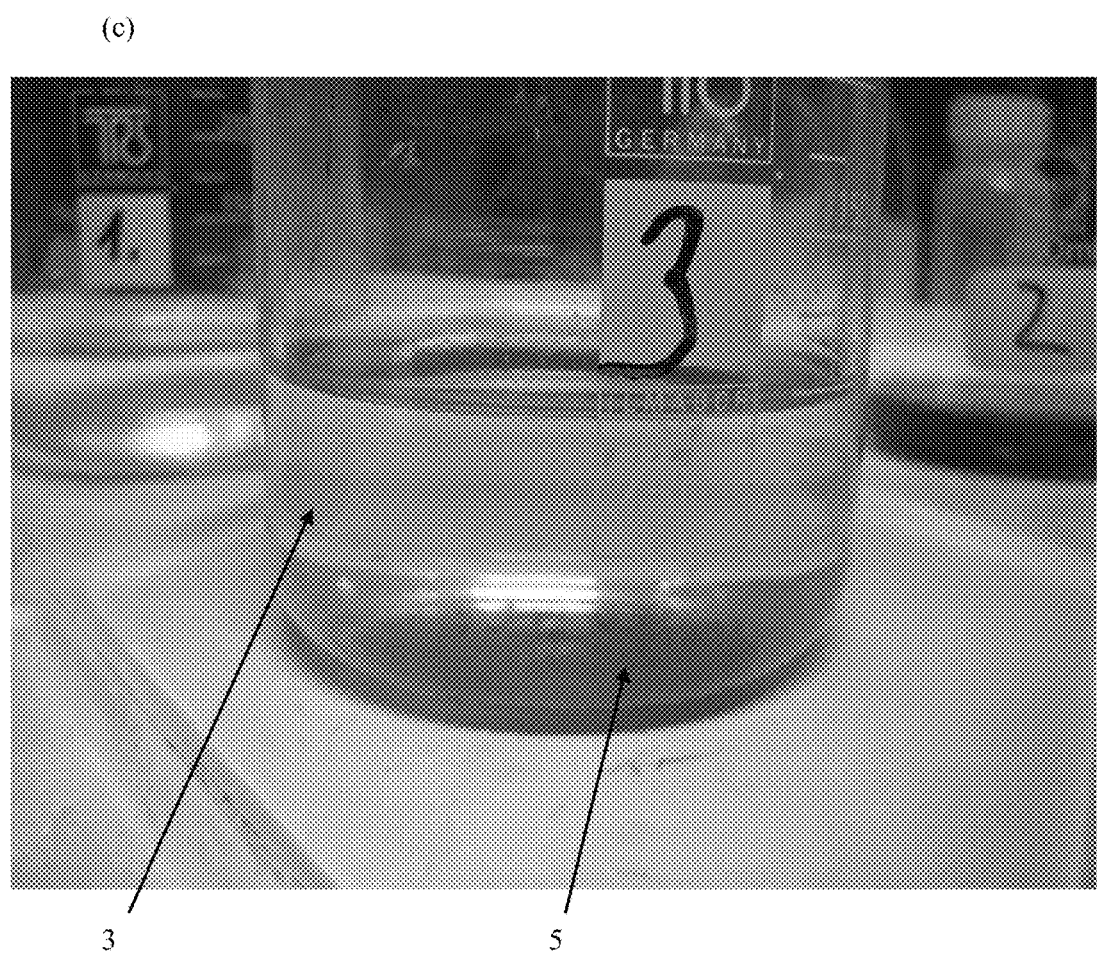
FIG. 6 shows an enlarged photograph of the third laboratory beaker from the left in the lower row of FIG. 4, the laboratory beaker containing an example of the present disclosure.

In the lower row of FIG. 4, the second laboratory beaker from the right contains an example (c) in accordance with the present disclosure. The same laboratory beaker is also shown in FIG. 6. The example (c) was obtained by adding a base to the effluent water/sample (a) in a sub-stoichiometric amount. As can be seen from FIG. 6, example (c) contains a sediment 5 including silicon at the bottom of the beaker and clarified effluent water 3 above the sediment 5. In this respect, it is assumed that a part of the silicon particles contained in the effluent water is dissolved in the effluent water (forming silicic acid), while another part of the silicon particles contained in the effluent water is aggregated to settle down/sediment, thereby forming the sediment 5. Accordingly, at least some of the silicon can be separated from the effluent water via sedimentation.

The example (c) was obtained by adding 0.2 mmol/l of NaOH to the effluent water/sample (a). The resulting mixture of the effluent water and the base was heated to and maintained at a predetermined temperature of about 60° C. for 5 minutes. Thereby, a sediment 5 including silicon was formed, and the sediment 5 could be separated from the clarified effluent water 3 above the sediment by decantation. In one or more embodiments, the addition of an understoichiometric amount of NaOH to the effluent water may have the effect that partially hydroxylated silicon particles are formed and react with one another by a condensation reaction such that larger silicon particles are formed, which may sink to the bottom of the beaker.

Figure 7:
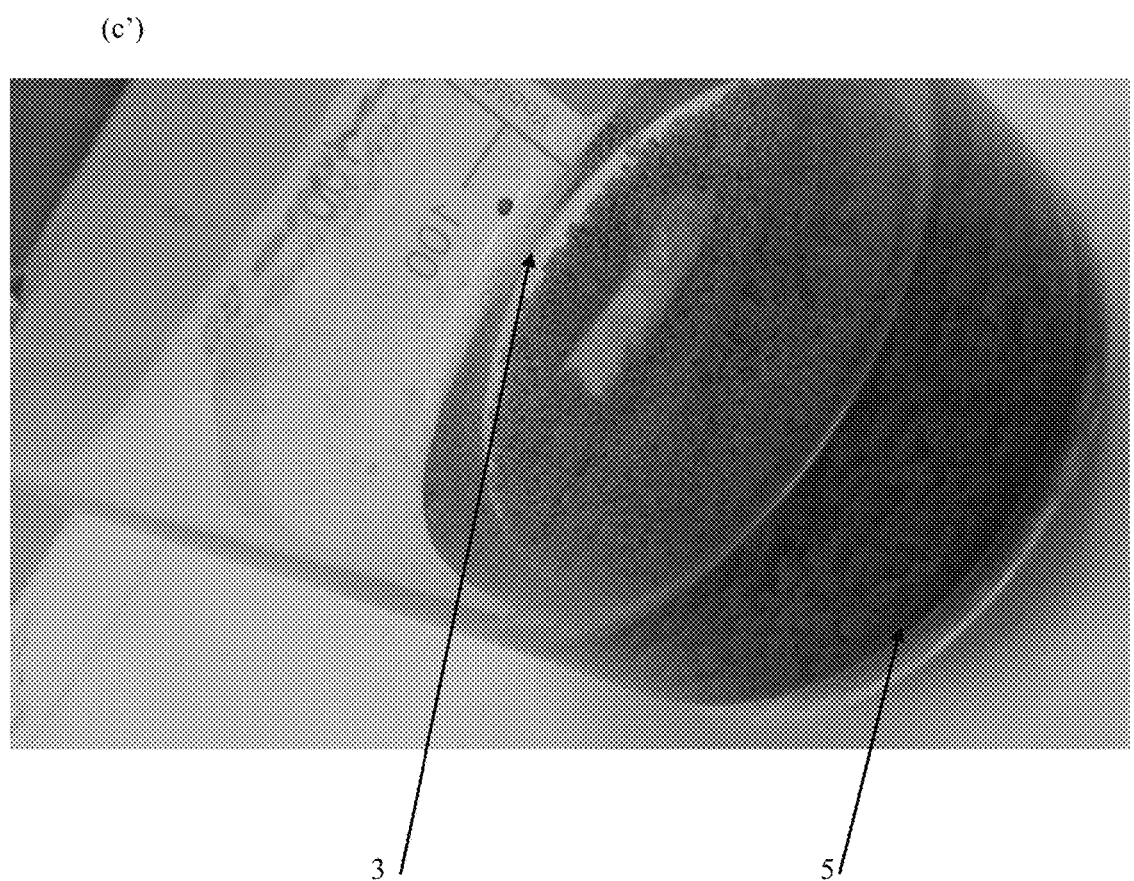
FIG. 7 shows an enlarged photograph of another laboratory beaker containing an effluent water treated with a method of removing particulate silicon from an effluent water in accordance with various embodiments, thus containing another example of the present disclosure.

FIG. 7 shows a laboratory beaker containing another example (c') in accordance with the present disclosure. The example (c') was obtained by adding a base to the effluent water/sample (a) in a sub-stoichiometric amount. As can be seen from FIG. 9, example (c') contains a sediment 5 including silicon at the bottom of the beaker and clarified effluent water 3 above the sediment 5. Accordingly, also in this example (c') at least some of the silicon could be separated from the effluent water via sedimentation.

The example (c') was obtained by adding 0.1 mmol/l of calcium hydroxide to the effluent water/sample (a). The resulting mixture of the effluent water and the base (in this case calcium hydroxide) was heated to and maintained at a predetermined temperature range of about 50° C. for 2 minutes. Thereby, a sediment 5 including silicon was formed, and the sediment 5 could be separated from the clarified effluent water 3 above the sediment by decantation.

For each of the examples (c) and (c'), the concentration of arsenic in the clarified effluent water above the sediment was measured and compared with the concentration of arsenic in the sample (a) (untreated effluent water). Since the concentration of arsenic in the clarified effluent water was lower than the concentration of arsenic in the untreated effluent water, it is obvious that in the examples (c) and (c') the arsenic is partially transferred to and contained in the sediment and thus removed from the effluent water together with the silicon.

Figure 8:
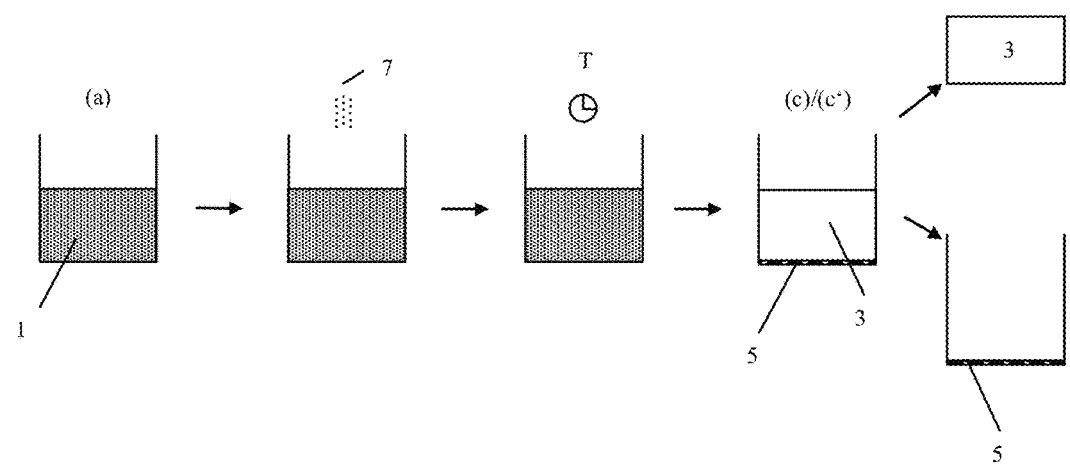
FIG. 8 schematically illustrates a method of removing particulate silicon from an effluent water in accordance with various embodiments.

FIG. 8 schematically illustrates the method of removing particulate silicon applied to the effluent water/sample (a) so as to obtain the above examples (c) and (c'). Initially, the effluent water is provided in a vessel. The untreated effluent water forms a dispersion 1 and has a dark and turbid appearance. Next, a base 7 (for example, solid sodium hydroxide, a sodium hydroxide solution or calcium hydroxide) is added to the effluent water. Then, the resulting mixture of the effluent water and the base is maintained in a predetermined temperature range for a period of time, so that a sediment 5 including silicon is formed. Above the sediment 5 is clarified effluent water 3. The clarified effluent water 3 may then be removed from the vessel, for example by decantation, thereby separating the sediment and the effluent water from each other, so that only the sediment 5 containing silicon (and optionally one or more dopants, such as arsenic) remains in the vessel.

Figure 9:
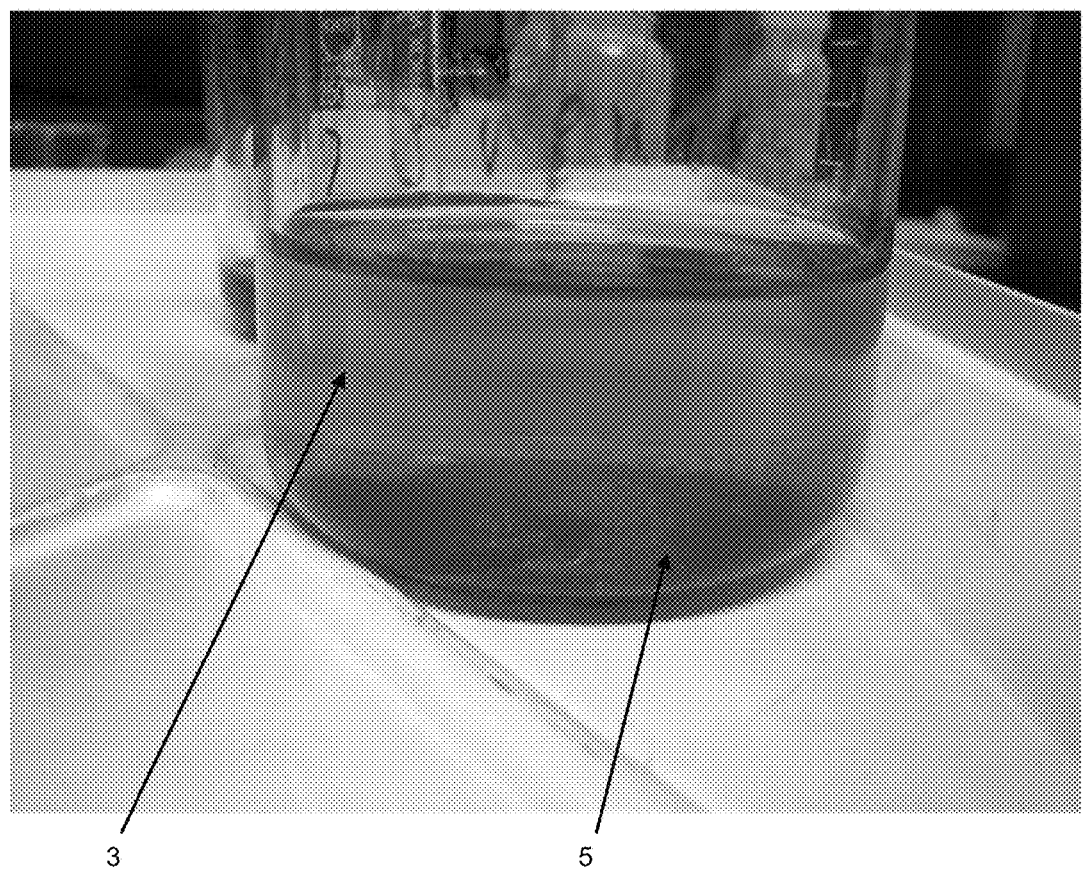
FIG. 9 shows an enlarged photograph of the second laboratory beaker from the left in the lower row of FIG. 4, the laboratory beaker containing yet another example of the present disclosure.
Figure 10:
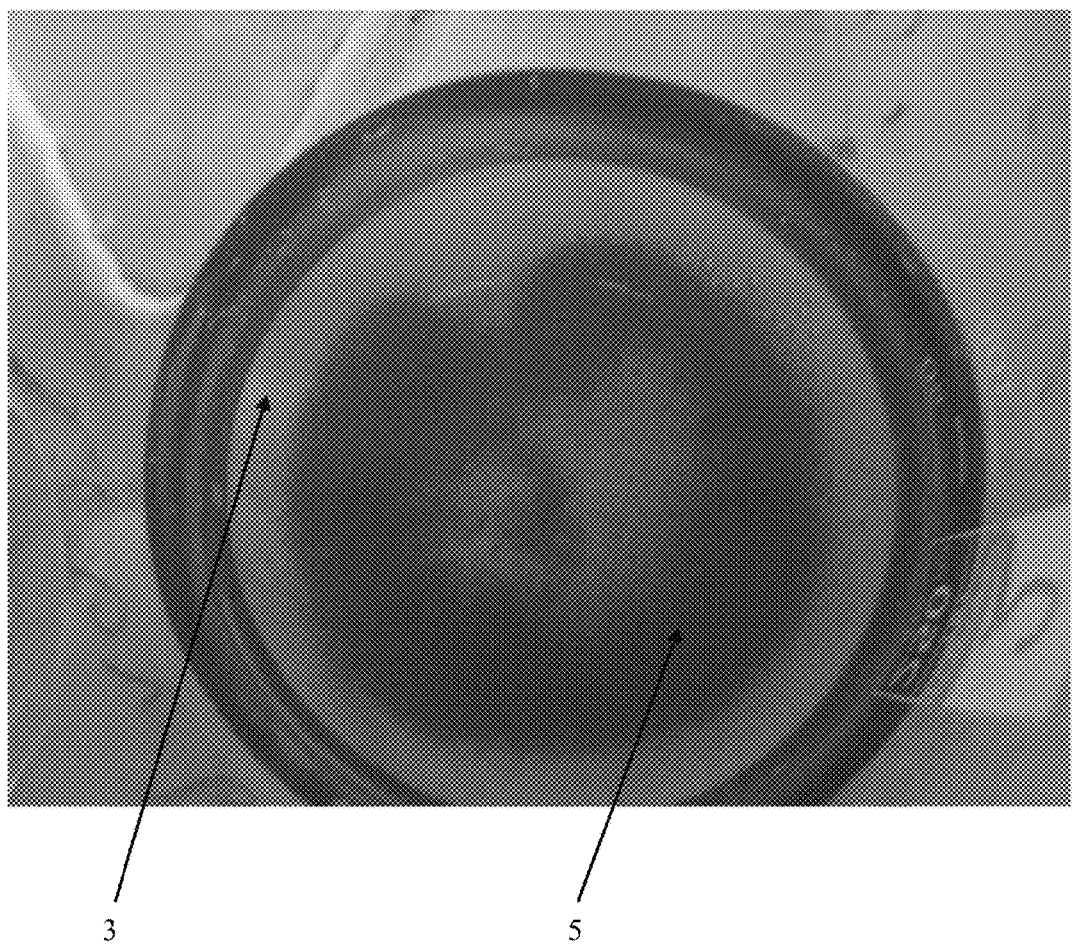
FIG. 10 shows another enlarged photograph of the second laboratory beaker from the left in the lower row of FIG. 4.

FIG. 9 shows a laboratory beaker containing yet another example (d) in accordance with the present disclosure. The same laboratory beaker/example (d) is also shown in FIG. 10, this time from above, and in FIG. 4 (the second beaker from the left in the lower row). The example (d) was obtained by adding a base to the effluent water/sample (a) in a sub-stoichiometric amount, and by additionally adding diammonium phosphate to the effluent water. As can be seen from FIGS. 9 and 10, example (d) contains a sediment 5 including silicon at the bottom of the beaker and clarified effluent water 3 above the sediment 5. Accordingly, also in this example (d) at least some of the silicon could be separated from the effluent water via sedimentation. It was observed that the amount of the sediment as well as the amount of silicon contained in the sediment could be significantly increased by further adding diammonium phosphate to the effluent water (for example, when compared to the above example (c) where only a base was used). Thus, formation of a sediment can be promoted/expedited (when compared to a normal sedimentation of silicon particles in untreated effluent water) by adding a base in a sub-stoichiometric amount, and can be further promoted/enhanced by additionally adding diammonium phosphate (or a similar component, such as one of the components mentioned in claim 12).

The example (d) was obtained by adding 0.2 mmol/l of sodium hydroxide (by adding a sodium hydroxide solution) and 0.02 mmol/l of diammonium phosphate to the effluent water/sample (a). The resulting mixture of the effluent water, the base (in this case sodium hydroxide) and diammonium phosphate was heated to and maintained at a predetermined temperature range of about 60° C. for 5 minutes. Thereby, a sediment 5 including silicon was formed, and the sediment 5 could be separated from the clarified effluent water 3 above the sediment by decantation.

The first laboratory beaker from the right in the lower row of FIG. 4 contains yet another example (d') in accordance with the present disclosure. The example (d') was obtained in the same manner as the example (d) and may be referred to as a reproduction of example (d).

For each of the examples (d) and (d'), the concentration of arsenic in the clarified effluent water above the sediment was measured and compared with both the concentration of arsenic in the sample (a) (untreated effluent water) and the concentration of arsenic in the clarified effluent water of example (c). Thereby, it was determined that the concentration of arsenic in the clarified effluent water of examples (d) and (d') was lower than the concentration of arsenic in the untreated effluent water and also lower than the concentration of arsenic in the clarified effluent water of example (c), so that it is obvious that not only the amount of silicon in the sediment but also the amount of arsenic in the sediment can be increased by adding diammonium phosphate.

Figure 11:
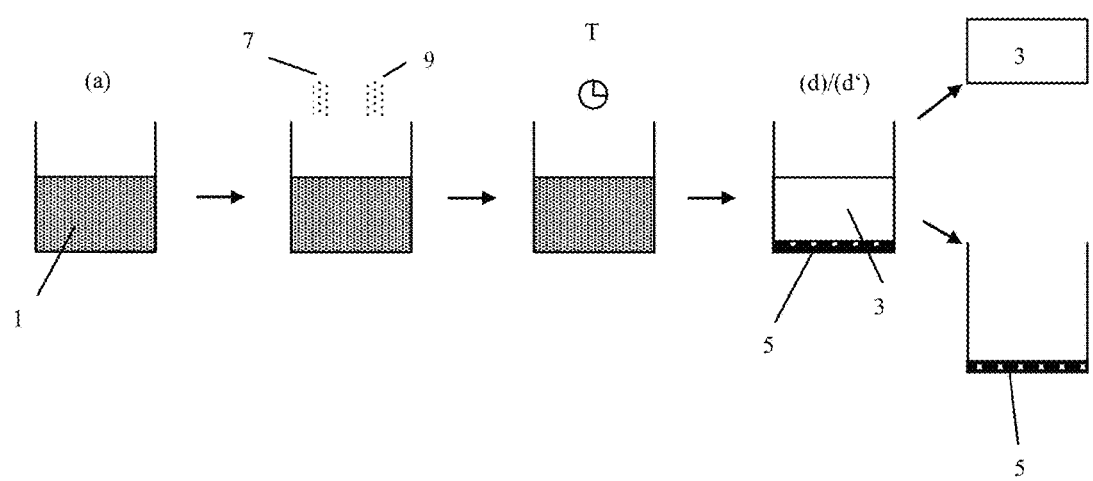
FIG. 11 schematically illustrates another method of removing particulate silicon from an effluent water in accordance with various embodiments.

FIG. 11 schematically illustrates the method of removing particulate silicon applied to the effluent water/sample (a) so as to obtain the above examples (d) and (d'). Initially, the effluent water is provided in a vessel. The untreated effluent water forms a dispersion 1 and has a dark and turbid appearance. Next, a base 7 (for example solid sodium hydroxide or a sodium hydroxide solution) is added to the effluent water together with diammonium phosphate 9 (or a similar component, such as one of the components mentioned in claim 12). The base 7 and the diammonium phosphate 9 may be added to the effluent water sequentially (i.e., first the base 7 and then the diammonium phosphate 9, or vice versa) or simultaneously. Then, the resulting mixture of the effluent water 1, the base 7 and the diammonium phosphate 9 is heated to and maintained in a predetermined temperature range for a period of time, so that a sediment 5 including silicon is formed. Above the sediment 5 is clarified effluent water 3. The clarified effluent water 3 may be removed from the vessel, for example by decantation, thereby separating the sediment and the effluent water from each other, so that only the sediment 5 containing silicon (and optionally one or more dopants, such as arsenic) remains in the vessel.

In the following, further embodiments of the present disclosure will be described.

A method of removing particulate silicon from an effluent water in accordance with various embodiments may include: adding a base to the effluent water, an amount of the added base being sub-stoichiometric with regard to a basic oxidation reaction of an entire amount of silicon contained in the effluent water to ortho-silicic acid ($Si(OH)_4$); maintaining a resulting mixture of the effluent water and the base in a predetermined temperature range for a period of time, so that a sediment including silicon is formed; and separating the sediment and the effluent water from each other.

Another method of removing particulate silicon from an effluent water in accordance with various embodiments may include: adding a base to the effluent water; maintaining a resulting mixture of the effluent water and the base in a predetermined temperature range for a period of time; wherein an amount of the added base is adjusted such that by maintaining the resulting mixture of the effluent water and the base in the predetermined temperature range for the period of time a sediment is formed containing at least a part of an entire amount of silicon contained in the effluent water; and separating the sediment and the effluent water from each other.

Yet another method of removing particulate silicon from an effluent water in accordance with various embodiments may include: adding a base to the effluent water; maintaining a resulting mixture of the effluent water and the base in a predetermined temperature range for a period of time; wherein an amount of the added base is adjusted such that an entire amount of silicon contained in the effluent water is prevented from being completely dissolved by means of the base during maintaining the resulting mixture of the effluent water and the base in the predetermined temperature range for the period of time; and separating the sediment and the effluent water from each other.

Yet another method of removing particulate silicon from an effluent water in accordance with various embodiments may include: adding a base to the effluent water in such an amount that a molar ratio of aqueous hydroxide ions provided by the base in the effluent water to silicon contained in the effluent water is less than or equal to 2:1, e.g. less than or equal to 1:1; maintaining a resulting mixture of the base and the effluent water in a predetermined temperature range for a period of time so as to allow formation of a sediment including silicon; and separating the sediment and the effluent water from each other.

Yet another method of removing particulate silicon from an effluent water in accordance with various embodiments may include: providing 0.02 to 0.1 mol of dissolved sodium hydroxide in the effluent water per gram silicon contained in the effluent water or providing 0.02 to 0.1 mol of dissolved potassium hydroxide in the effluent water per gram silicon contained in the effluent water or providing 0.01 to 0.05 mol of dissolved calcium hydroxide in the effluent water per gram silicon contained in the effluent water or providing 0.02 to 0.1 mol of dissolved barium hydroxide in the effluent water per gram silicon contained in the effluent water or providing 0.02 to 0.1 mol of ammonium in the effluent water per gram silicon contained in the effluent water or providing 0.02 to 0.1 mol of dissolved sodium hydroxide in the effluent water per gram silicon contained in the effluent water, wherein the dissolved sodium hydroxide is partially or entirely substituted with one or more of the following: dissolved potassium hydroxide in a molar substitution ratio of 1:1, dissolved calcium hydroxide in a molar substitution ratio of 1:2, dissolved barium hydroxide in a molar substitution ratio of 1:2 and ammonium in a molar substitution ratio of 1:1; maintaining a resulting mixture of the effluent water and one or more of the dissolved sodium hydroxide, the dissolved potassium hydroxide, the dissolved calcium hydroxide, the dissolved barium hydroxide and the ammonium in a predetermined temperature range for a period of time so as to allow formation of a sediment including silicon; and separating the sediment and the effluent water from each other.

In the following, exemplary embodiments are described, wherein these exemplary embodiments are valid for and may be combined with each of the above five methods. Further, it is possible to combine two or more or all of the below exemplary embodiments with each other. Still further, it is also possible to combine two or more of the above five methods (or the features thereof) with each other.

In one or more exemplary embodiments, the base may contain one or more of sodium hydroxide, potassium hydroxide, calcium hydroxide, barium hydroxide and ammonia. For example, amongst the said bases, sodium hydroxide, potassium hydroxide, calcium hydroxide and barium hydroxide may be added in liquid form (for example, as a solution with water) and/or in solid form. For example, ammonia may be added in gaseous form or in liquid form (for example, as a solution with water).

In one or more exemplary embodiments, the base may be added in the form of an alkaline solution.

In one or more exemplary embodiments, the alkaline solution may be selected from the group consisting of a sodium hydroxide solution, a potassium hydroxide solution, a calcium hydroxide solution, a barium hydroxide solution, an ammonia solution and combinations thereof.

In one or more exemplary embodiments, the base may be added to the effluent water in such an amount that a molar ratio of aqueous hydroxide ions provided/formed by the base in the effluent water to silicon contained in the effluent water is equal to or less than 1:1. For example, the molar ratio can be equal to or less than 0.9:1. For example, the molar ratio can be equal to or less than 0.8:1. For example, the molar ratio can be equal to or less than 0.7:1. For example, the molar ratio can be equal to or less than 0.6:1. For example, the molar ratio can be equal to or less than 0.5:1. For example, the molar ratio can be equal to or less than 0.4:1. For example, the molar ratio can be equal to or less than 0.3:1. For example, the molar ratio can be equal to or less than 0.2:1. For example, the molar ratio can be equal to or less than 0.1:1.

In one or more exemplary embodiments, the base may be added to the effluent water in such an amount that a molar ratio of aqueous hydroxide ions provided by the base in the effluent water to silicon contained in the effluent water is greater than or equal to 0.01:1.

Thus, for example, the base may be added to the effluent water in such an amount that a molar ratio of aqueous hydroxide ions provided by the base in the effluent water to silicon contained in the effluent water is equal to or less than 1:1 and greater than 0.01:1. However, the upper and lower boundary values of the molar ratio may also be combined with each other in a different manner, for example to result in an exemplary molar ratio which is equal to or smaller than 0.8:1 and greater than or equal 0.01:1.

In one or more exemplary embodiments, the method may further include determining an amount of silicon contained in the effluent water. For example, the amount of silicon contained in the effluent water may be determined prior to adding the base to the effluent water. For example, the amount of silicon contained in the effluent water may be determined by measuring or estimating the amount. For example, a sample may be taken from the effluent water, an amount of silicon contained in the sample may be measured, and the amount of silicon contained in the effluent water may be determined based on the measured amount of silicon contained in the sample. For example, the amount of silicon contained in the effluent water may be determined directly in a sedimentation basin or sedimentation vessel in which the effluent water is received. For example, the determined amount of silicon contained in the effluent water may be used to determine the amount of the base to be added to the effluent water.

In one or more exemplary embodiments, the predetermined temperature range may be equal to or higher than 40° C., for example equal to or higher than 45° C., for example equal to or higher than 50° C., for example equal to or higher than 55° C., for example equal to or higher than 60° C.

In one or more exemplary embodiments, the predetermined temperature range may be smaller than the boiling temperature of the base.

In one or more exemplary embodiments, the predetermined temperature range may be equal to or smaller than 90° C., for example equal to or smaller than 85° C., for example equal to or smaller than 80° C., for example equal to or smaller than 75° C., for example equal to or smaller than 70° C.

Thus, an exemplary predetermined temperature range may be equal to or smaller than 90° C. and equal to or higher than 40° C., for example equal to or smaller than 85° C. and equal to or higher than 45° C., for example equal to or smaller than 80° C. and equal to or higher than 50° C., for example equal to or smaller than 75° C. and equal to or higher than 55° C., for example equal to or smaller than 70° C. and equal to or higher than 60° C. However, the upper and lower boundary values of the predetermined temperature range may also be combined with each other in a different manner, for example to result in an exemplary predetermined temperature range which is equal to or smaller than 80° C. and equal to or higher than 40° C.

In one or more exemplary embodiments, the period of time may be greater than or equal to 2 minutes, for example greater than or equal to 3 minutes, for example greater than or equal to 4 minutes, for example greater than or equal to 5 minutes, for example greater than or equal to 6 minutes.

In one or more exemplary embodiments, the period of time may be less than or equal to 14 minutes, for example less than or equal to 12 minutes, for example less than or equal to 10 minutes, for example less than or equal to 9 minutes, for example less than or equal to 8 minutes.

Thus, an exemplary period of time may be less than or equal to 14 minutes and greater than or equal to 2 minutes, for example less than or equal to 12 minutes and greater than or equal to 3 minutes, for example less than or equal to 10 minutes and greater than or equal to 4 minutes, for example less than or equal to 9 minutes and greater than or equal to 5 minutes, for example less than or equal to 8 minutes and greater than or equal to 6 minutes. However, the upper and lower boundary values of the period of time may also be combined with each other in a different manner, for example to result in an exemplary period of time which is less than or equal to 10 minutes and greater than or equal to 3 minutes.

In one or more exemplary embodiments, the method may further include mixing (for example stirring) the resulting mixture of the effluent water and the base so as to obtain a homogenous mixture and evenly distribute the base in the effluent water. For example, the mixing may be carried out between the adding of the base and the maintaining of the mixture in the predetermined temperature range, and/or (at least temporarily) during maintaining of the mixture in the predetermined temperature range, and/or (at least temporarily) during adding of the base.

In one or more exemplary embodiments, the method may further include heating the resulting mixture of the effluent water and the base so as to raise the temperature of the mixture to the predetermined temperature range and/or to maintain the temperature of the mixture within the predetermined temperature range. The heating may include supplying heat from the outside ("external heat supply") and/or an internal heat supply (for example in the form of heat of reaction and/or heat of solution).

In one or more exemplary embodiments, the sediment resulting from the maintaining the mixture in the predetermined temperature range for the period of time may include at least 10 percent of the entire amount (for example expressed in mol or g) of silicon initially contained in the effluent water, for example at least 20 percent, for example at least 30 percent, for example at least 40 percent, for example at least 50 percent, for example at least 60 percent, for example at least 70 percent, for example at least 80 percent, for example at least 90 percent.

In one or more exemplary embodiments, separating the sediment and the (clarified) effluent water from each other may be carried out by removing the effluent water located above the sediment, for example by decantation of the (clarified) effluent water or by draining or pumping away the (clarified) effluent water above the sediment. For example, the remaining sediment (e.g., sludge) may be further processed, for example dewatered, for example using a filter press.

In one or more exemplary embodiments, the method may further include adding to the effluent water a component selected from the group consisting of diammonium phosphate ($H(NH_4)_2PO_4$), mono-ammonium phosphate (($NH_4$)$H_2PO_4$), ammonium sulfate (($NH_4$)$_2SO_4$), ammonium hydrogen sulfate ($NH_4HSO_4$) and combinations thereof.

In one or more exemplary embodiments, the component may be added in an amount of equal to or less than 20 mol %, for example equal to or less than 10 mol %. The added amount of the component in mol % represents the molar ratio of the component to the mixture of the effluent water, added base and added component.

In one or more exemplary embodiments, the component may be added in an amount of equal to or more than 5 mol %, for example equal to or more than 10 mol %.

Thus, for example, the component may be added in an amount of equal to or more than 5 mol % and equal to or less than 20 mol %, for example equal to or more than 5 mol % and equal to or less than 10 mol %, or for example equal to or more than 10 mol % and equal to or less than 20 mol %. However, the upper and lower boundary values of the amount of the component may also be different.

In one or more exemplary embodiments, adding the said component may promote the formation of the sediment and/or the transfer of the silicon from the effluent water to the sediment, thereby increasing the amount of sediment and the amount of silicon contained in the sediment.

In one or more exemplary embodiments, the effluent water may originate from a production of one or more chips and/or from a processing of one or more wafers. For example, the processing of one or more wafers may include one or more of grinding, polishing (for example CMP) and thinning of a wafer.

In one or more exemplary embodiments, the effluent water may contain silicon particles in a mass concentration of equal to or less than 250 mg per liter, for example in a mass concentration of equal to or less than 200 mg per liter, for example in a mass concentration of equal to or less than 150 mg per liter, for example in a mass concentration of equal to or less than 100 mg per liter (e.g., respectively at 20° C.).

In one or more exemplary embodiments, the effluent water may contain silicon particles in a mass concentration of at least 10 mg per liter.

Thus, for example, the effluent water may contain silicon particles in a mass concentration of at least 10 mg per liter and equal to or less than 250 mg per liter, for example at least 50 mg per liter and equal to or less than 250 mg per liter. However, the upper and lower boundary values of the concentration may also be different.

In one or more exemplary embodiments, a size (for example average size) of silicon particles contained in the effluent water may be in a sub micrometer range. For example, an average particle size of the silicon particles may be equal to or less than 0.2 micrometer. For example, the said average particle size may be obtainable via a laser diffraction method.

In one or more exemplary embodiments, the effluent water may contain a dopant, wherein the dopant is at least partially removed from the effluent water together with silicon via the sediment. For example, the dopant may be arsenic. For example, the sediment resulting from the maintaining the mixture in the predetermined temperature range for the period of time may include at least 10 percent of the entire amount (for example expressed in mol or g) of dopant initially contained in the effluent water, for example at least 20 percent, for example at least 30 percent, for example at least 40 percent, for example at least 50 percent, for example at least 60 percent, for example at least 70 percent, for example at least 80 percent, for example at least 90 percent.

In one or more exemplary embodiments, the method may be carried out using a sedimentation basin or sedimentation vessel. For example, the basin or vessel may have a holding capacity of at least at least 1 m$^3$, for example at least 10 m$^3$, for example at least 100 m$^3$.

In one or more exemplary embodiments, the method may be carried out in a discontinuous manner, for example batchwise (as a batch process).

In one or more exemplary embodiments, the particulate silicon may be removed from the effluent water without using or adding a metallic salt, such as iron chloride.

In one or more exemplary embodiments, the sediment may be formed without or in the absence of a co-precipitation reaction or precipitation reaction.

In one or more exemplary embodiments, formation of the sediment may be initiated by a chemical reaction of at least a portion of the silicon (particles) contained in the effluent with the base. For example, the chemical reaction of at least a portion of the silicon (particles) contained in the effluent with the base may include or consist of a partial basic oxidation of at least a portion of the silicon (particles) contained in the effluent with the base. For example, the chemical reaction (e.g., partial basic oxidation) may be followed by an agglomeration of at least a portion of the silicon (particles) reacted with the base (e.g., an agglomeration of at least a portion of the partially oxidised silicon particles). For example, the agglomeraton may include a condensation reaction.

In one or more exemplary embodiments, the sediment may be formed as a result of a partial basic oxidation of at least some of the silicon particles by the base (to thereby form partially oxidised silicon particles) and/or an agglomeration of at least a portion of the silicon particles contained in the effluent water.

In one or more exemplary embodiments, the sediment may contain partially oxidised silicon particles, for example silicon particles the surface of which has been oxidised (by an attack of OH$^-$ ions). For example, at least a portion of the partially oxidised silicon particles contained in the sediment may be present in the form of agglomerates containing partially oxidised silicon particles agglomerated or sticking together, for example by means of a condensation reaction.

While various aspects of this disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of removing elementary solid particulate silicon from an effluent water containing elementary solid particulate silicon, the method comprising:
    adding a base to the effluent water, an amount of the added base being sub-stoichiometric with regard to a basic oxidation reaction of an entire amount of silicon contained in the effluent water to ortho-silicic acid;
    forming a sediment including silicon, wherein forming the sediment comprises:
        maintaining a resulting mixture of the effluent water and the base in a predetermined temperature range for a period of time, wherein the formed sediment comprises an agglomeration of at least a portion of the solid particulate silicon that has reacted with the base; and
        separating the sediment and the effluent water from each other,
    wherein the particulate silicon is removed from the effluent water without adding a metallic salt to the effluent water in addition to the base, and
    wherein the sediment is formed in the absence of a precipitation reaction.

2. The method of claim 1, wherein the base comprises one or more of sodium hydroxide, potassium hydroxide, calcium hydroxide, barium hydroxide and ammonia.

3. The method of claim 1, wherein the base is added in the form of an alkaline solution.

4. The method of claim 3, wherein the alkaline solution is selected from the group consisting of a sodium hydroxide solution, a potassium hydroxide solution, a calcium hydroxide solution, a barium hydroxide solution, an ammonia solution and combinations thereof.

5. The method of claim 1, wherein the base is added to the effluent water in such an amount that a molar ratio of aqueous hydroxide ions provided by the base in the effluent water to silicon contained in the effluent water is equal to or less than 1:1.

6. The method of claim 1, wherein the base is added to the effluent water in such an amount that a molar ratio of aqueous hydroxide ions provided by the base in the effluent to silicon contained in the effluent water is greater than or equal to 0.01:1.

7. The method of claim 1, wherein the predetermined temperature range is equal to or higher than 40° C.

8. The method of claim 1, wherein the predetermined temperature range is smaller than the boiling temperature of the base.

9. The method of claim 1, wherein the predetermined temperature range is equal to or smaller than 90° C.

10. The method of claim 1, wherein the period of time is greater than or equal to 2 minutes.

11. The method of claim 1, wherein the period of time is less than or equal to 14 minutes.

12. The method of claim 1, the method further comprising:
    adding to the effluent water a component selected from the group consisting of diammonium phosphate, monoammonium phosphate, ammonium sulfate, ammonium hydrogen sulfate and combinations thereof.

13. The method of claim 12, wherein the component is added in an amount of equal to or less than 20 mol %.

14. The method of claim 12, wherein the component is added in an amount of equal to or more than 5 mol %.

15. The method of claim 1, wherein the effluent water originates from a production of one or more chips and/or from a processing of one or more wafers.

16. The method of claim 1, wherein the effluent water contains silicon particles in a mass concentration of equal to or less than 250 mg per liter, or wherein a size of silicon particles contained in the effluent water is in a sub micrometer range.

17. The method of claim 1, wherein the sediment is formed in the absence of a co-precipitation reaction.

18. The method of claim 1, wherein the effluent water contains a dopant, and wherein the dopant is at least partially removed from the effluent water together with silicon via the sediment.

19. The method of claim 1, wherein the at least a portion of the solid particulate silicon that has reacted with the base comprises partially oxidized silicon particles.

20. A method of removing elementary solid particulate silicon from an effluent water containing elementary solid particulate silicon, the method comprising:
   adding a base to the effluent water in such an amount that a molar ratio of aqueous hydroxide ions provided by the base in the effluent water to silicon contained in the effluent water is less than or equal to 2:1;
   forming a sediment including silicon, wherein forming the sediment comprises:
      maintaining a resulting mixture of the base and the effluent water in a predetermined temperature range for a period of time, wherein the sediment comprises an agglomeration of at least a portion of the solid particulate silicon that has reacted with the base; and
   separating the sediment and the effluent water from each other,
   wherein the particulate silicon is removed from the effluent water without adding a metallic salt to the effluent water in addition to the base, and
   wherein the sediment is formed in the absence of a precipitation reaction.

21. A method of removing elementary solid particulate silicon from an effluent water containing elementary solid particulate silicon, the method comprising:
   providing 0.02 to 0.1 mol of dissolved sodium hydroxide in the effluent water per gram silicon contained in the effluent water or
   providing 0.02 to 0.1 mol of dissolved potassium hydroxide in the effluent water per gram silicon contained in the effluent water or
   providing 0.01 to 0.05 mol of dissolved calcium hydroxide in the effluent water per gram silicon contained in the effluent water or
   providing 0.02 to 0.1 mol of dissolved barium hydroxide in the effluent water per gram silicon contained in the effluent water or
   providing 0.02 to 0.1 mol of ammonium in the effluent water per gram silicon contained in the effluent water or
   providing 0.02 to 0.1 mol of dissolved sodium hydroxide in the effluent water per gram silicon contained in the effluent water, wherein the dissolved sodium hydroxide is partially or entirely substituted with one or more of the following: dissolved potassium hydroxide in a molar substitution ratio of 1:1, dissolved calcium hydroxide in a molar substitution ratio of 1:2, dissolved barium hydroxide in a molar substitution ratio of 1:2 and ammonium in a molar substitution ratio of 1:1;
   forming a sediment including silicon, wherein forming the sediment comprises:
      maintaining a resulting mixture of the effluent water and one or more of the dissolved sodium hydroxide, the dissolved potassium hydroxide, the dissolved calcium hydroxide, the dissolved barium hydroxide and the ammonium in a predetermined temperature range for a period of time, wherein the sediment comprises an agglomeration of at least a portion of the solid particulate silicon that has reacted with the base; and
   separating the sediment and the effluent water from each other,
   wherein the particulate silicon is removed from the effluent water without adding a metallic salt to the effluent water in addition to the base, and
   wherein the sediment is formed in the absence of a precipitation reaction.

* * * * *